US007806676B2

(12) United States Patent
Hensley et al.

(10) Patent No.: US 7,806,676 B2
(45) Date of Patent: Oct. 5, 2010

(54) AUTOMATED CONCRETE CASTING SYSTEM

(75) Inventors: Jason Hensley, Shakopee, MN (US); Thomas Kuckhahn, Prior Lake, MN (US); Richard Wesen, Westfield, IN (US); Greg Morford, Minneapolis, MN (US); Michael LeJeune, Wayzata, MN (US); Patrick M. Heman, Longdale, MN (US); Mark Yzermans, Cottage Grove, MN (US)

(73) Assignee: Fabcon, Inc., Savage, MN (US)

( * ) Notice: Subject to any disclaimer, the term of this patent is extended or adjusted under 35 U.S.C. 154(b) by 0 days.

(21) Appl. No.: 11/504,232

(22) Filed: Aug. 15, 2006

(65) Prior Publication Data

US 2008/0044509 A1 Feb. 21, 2008

(51) Int. Cl.
*B23K 26/02* (2006.01)
*B28B 1/14* (2006.01)

(52) U.S. Cl. ........................ 425/169; 425/150; 425/173; 425/261; 264/40.7; 264/333; 356/622

(58) Field of Classification Search ................. 425/147, 425/150, 220, 261, 447–449, 451, 451.3, 425/169, 173, 259; 264/409, 497, 406, 408, 264/482, 40.5, 40.7, 333; 249/205, 53 R, 249/117, 139; 356/601, 620–622
See application file for complete search history.

(56) References Cited

U.S. PATENT DOCUMENTS 4,521,118 A * 6/1985 Rosencwaig .................... 374/5
4,892,407 A * 1/1990 McMurtry et al. ........... 356/622
5,144,330 A * 9/1992 Bennett .......................... 347/2
5,169,652 A * 12/1992 Del Monte .................. 425/430
5,212,647 A * 5/1993 Raney et al. ................. 700/192
5,304,773 A * 4/1994 Kilian et al. ........... 219/121.78
5,755,982 A * 5/1998 Strickland et al. ............. 249/74
5,766,538 A * 6/1998 Kossmann .................. 264/407
5,820,887 A * 10/1998 Mogel ........................... 425/64
6,631,006 B2 * 10/2003 Dick et al. .................. 356/625
6,779,175 B2 * 8/2004 Susnjara ...................... 717/136
7,001,016 B2 * 2/2006 Baxter et al. ................ 347/101
7,014,284 B2 * 3/2006 Morton et al. ................. 347/4
7,171,738 B2 * 2/2007 Dick et al. ..................... 29/563
7,175,414 B2 * 2/2007 Ness et al. .................. 425/441
7,210,919 B2 5/2007 Senosiain
7,225,045 B2 * 5/2007 Gothait et al. .............. 700/119

(Continued)

FOREIGN PATENT DOCUMENTS

EP 0 798 190 B1 3/1997

(Continued)

OTHER PUBLICATIONS

Translation of JP 06-272376.*

*Primary Examiner*—Philip C Tucker
*Assistant Examiner*—Dimple N Bodawala
(74) *Attorney, Agent, or Firm*—Vidas, Arrett & Steinkraus P.A. Fabcon

(57) ABSTRACT

A system for automating the casting of concrete panels in which a bed position indicator is fed to a program which compares the bed position to CAD drawings concerning the concrete to be cast and sends the drawing detail for the position of the bed which is then shown on the bed by a laser.

8 Claims, 4 Drawing Sheets

U.S. PATENT DOCUMENTS

2002/0055797 A1* 5/2002 Susnjara et al. ............... 700/95
2003/0182011 A1* 9/2003 Scherer ...................... 700/117
2004/0004303 A1* 1/2004 Iskra .......................... 264/109
2004/0104515 A1* 6/2004 Swanson et al. ............ 264/497
2005/0110198 A1* 5/2005 Nesbitt ....................... 264/409
2006/0016957 A1* 1/2006 Hofmann ................. 250/201.1
2006/0130623 A1* 6/2006 Ceroll et al. ................... 83/13
2006/0192322 A1* 8/2006 Abe et al. ................... 264/497
2007/0058175 A1* 3/2007 Maierhofer ................. 356/601

FOREIGN PATENT DOCUMENTS

JP 06272376 A * 9/1994

* cited by examiner

AUTOMATED CONCRETE CASTING SYSTEM

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates to a concrete casting system. Such systems typically have either a moving bed or a fixed bed on which the concrete panels or planks are formed. In the moving bed systems, a long bed moves on a track past each of the various stations that form the panels. In a fixed bed, the various stations themselves move, such as a hopper that pours concrete onto the bed.

In either system, it is vital to know the precise location on the bed at any time so that any special handling may be done exactly where it is intended. For example, openings, lifting lugs, cutouts, different insulation and metal reinforcement may all be placed into the beds at differing points. In addition, finishes on the top layer of concrete may vary throughout the bed per the requirements of the customers. In addition, when the cured concrete is to be cut into discrete lengths an exact location must be known on where to cut the concrete panel.

Typically, an entire casting bed will have a detailed drawing, often on CAD (Computer assisted drafting) which shows the workers where each feature throughout the bed must be placed. This involves giving each of the plant workers the required prints of the bed to be cast so they know exactly where each feature must be added.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

BRIEF SUMMARY OF THE INVENTION

The invention provides an automated system for casting concrete panels which takes CAD drawings for a casting bed that covers the features throughout the length of the bed and accurately projects a laser generated image of the drawings over the bed at the exact location corresponding to the CAD drawings. This enables the workers to perform whatever functions are needed at that location on the bed, such as placement of lifting lug points, openings, insulation, and surface finishes.

The automated system utilizes laser projectors such as those available from LAP GmbH Laser Applikationen of Lueneburg, Germany in combination with its CAD drawings and a positioning system on its concrete casting bed to relate the precise position on the casting bed to the CAD which is tied to the laser projector. This allows the CAD drawings to be projected onto the casting bed as a visible drawing representation such that the workers can immediately see precisely where each and every feature to be included in the concrete which they are about to cast.

BRIEF DESCRIPTION OF THE DRAWINGS

A detailed description of the invention is hereafter described with specific reference being made to the drawings in which.

DETAILED DESCRIPTION OF THE INVENTION

Figure 1:
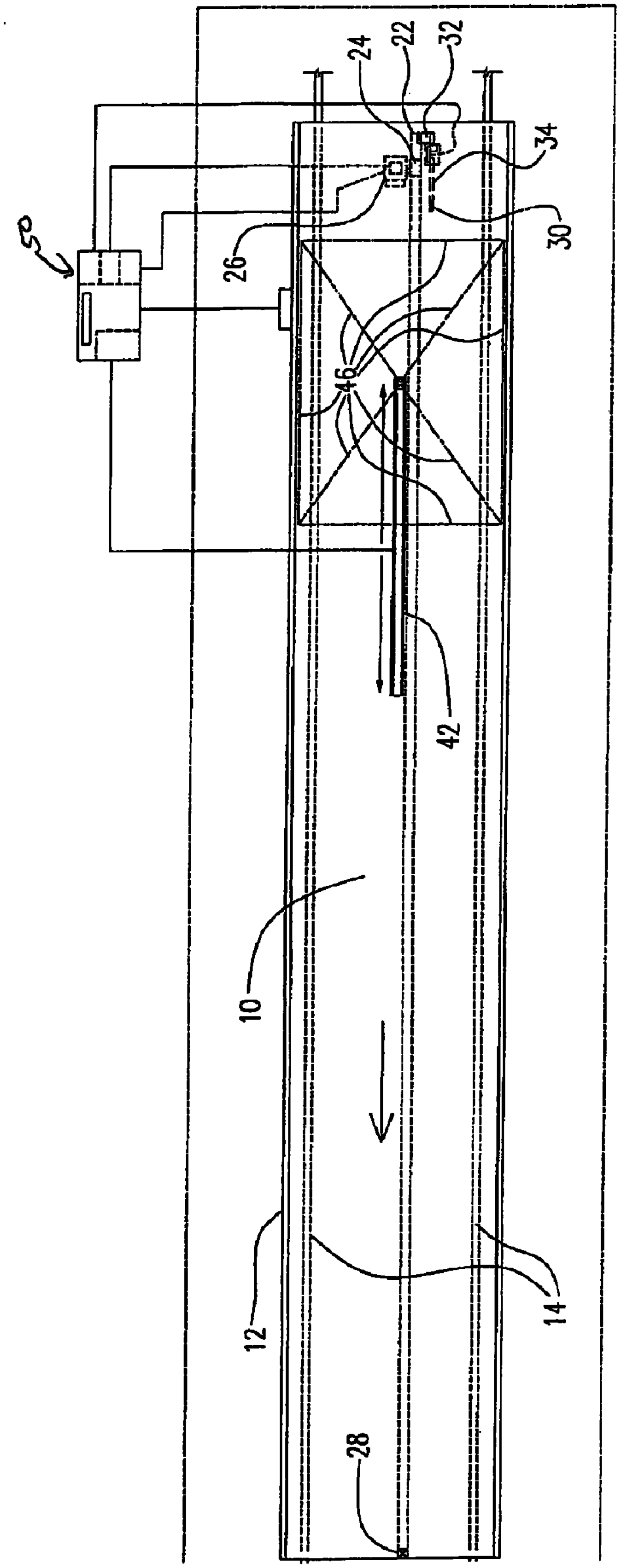
FIG. 1 is a top view of a concrete casting bed with the inventive system.

With reference to FIG. 1, the form of the invention in which a moving casting bed 10 is employed is shown. Moving casting beds 10 are well known in the art, and typically include a concrete form 12 that may be 900 feet long. The bed 10 has tracks 14 that ride on rails such that the entire bed 10 may be moved down the rails. This allows the bed 10 to be moved to each of the fixed stations, such as for pouring concrete on the bed from an overhead hopper.

Figure 2:
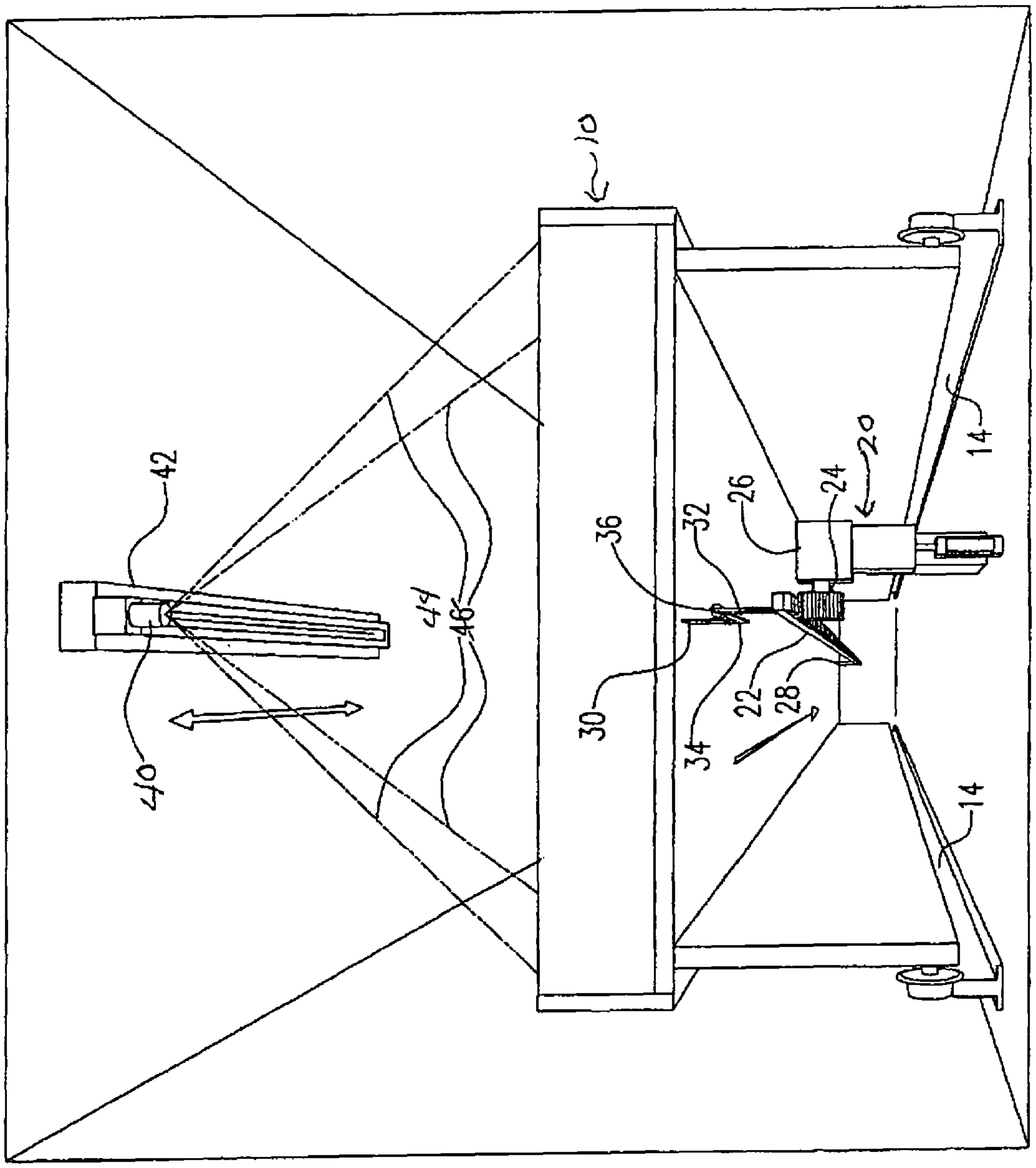
FIG. 2 is an end, partially perspective view showing the laser system and bed.
Figure 3:
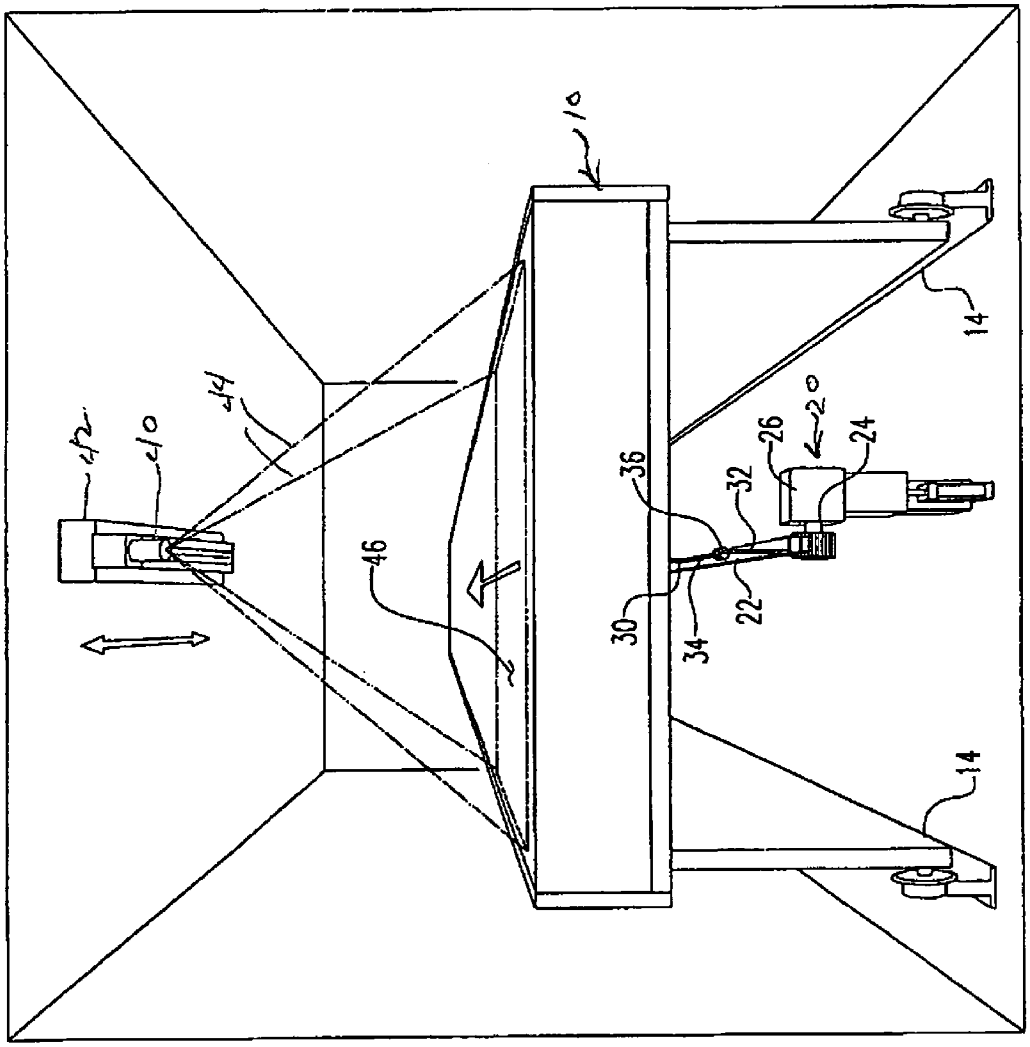
FIG. 3 is an end, partially perspective view similar to that of FIG. 2 in which the perspective is slightly higher.
Figure 4:
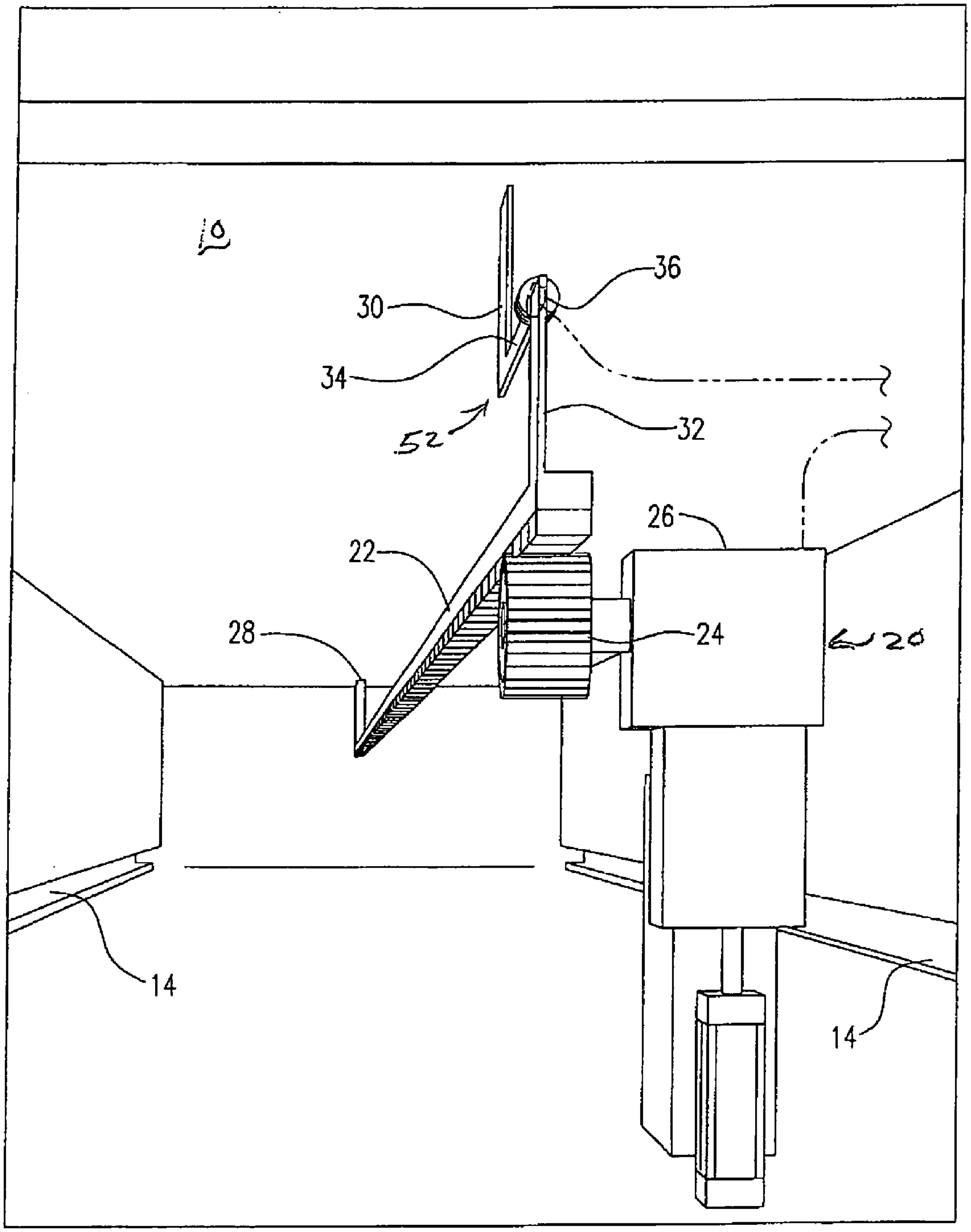
FIG. 4 is an end view showing a bed positioning mechanism.

The underside of a typical casting bed 10 is shown in FIGS. 2-4 in which it will be seen that a mechanism to precisely indicate the exact position on the bed 10 may be generated. The bed position device 20 is used to provide a signal that indicates the exact position of the bed to a known position in the plant. As shown, it involves the addition of a rack 22 to the underside of the casting bed 10. The toothed rack 22 engages with a pinion 24 which is attached to an encoder reader 26 for transmitting the position of the bed based on the position of the rack. The rack 22 has a fixed rack anchor 28. The bed 10 includes a thermal expansion detector module 52 which includes a bed fixture bracket 30 which together with a linear decoder post 32 and a verneer code readable scale 34 and linear encoded track monitor 36 is able to accurately gauge and report any differences in length of the bed due to tension of the prestressing cables or temperature changes. This allows variations in the casting bed 10 length to be accounted for due to seasonal temperature changes, and stress changes due to prestressing in the bed which over a very long casting bed 10 can be significant. The fixed encoder 26 is fed the bed length information and transmits the exact position on the bed as read by the rack 22. A control station 50 handles bed positioning from bed position device 20, temperature compensation changes from the thermal expansion detector module 52.

Now that a precise location on the moving casting bed 10 is known, it is possible to use that information in conjunction with the CAD drawings on a computer. An overhead projector laser 40 is mounted to an overhead track 42 above the casting bed 10. The laser 40 shown is a CAD Pro 2D laser projector from LAP GmbH Laser Applikationen of Lueneburg, Germany. Such projectors 40 reads common CAD files directly and project a rapidly moving laser line onto the casting bed 10 such that the CAD drawing appears to be "painted" on the surface of the casting bed 10. Since the casting bed 10 is so long, the CAD drawing is typically displayed in 20 foot increments on the casting bed 10. While the bed 10 moves, the laser 40 is able to track with the moving bed by virtue of being movably mounted to the overhead track 42. Thus, the fixed portion of the CAD drawing to be displayed onto the casting bed 10 is able to be kept on the bed while it is moving over the length of the overhead track. The next portion of the CAD drawing is then projected by the laser 40 onto the casting bed as the bed 10 moves.

It will be seen that the exact position of the moving bed 10 must be known in order for the laser 40 to project the CAD drawing segment onto the proper position of the bed 10. FIG. 2 shows the laser 40 projecting the CAD drawings with lines 44 indicating the area in which the pattern may be projected. FIG. 1 shows the laser field pattern area 46 which moves along with the movement of the laser 40 on its track 42.

The invention has been shown in the figures in connection with a moving casting bed. The invention is also used in fixed bed casting, in which the bed is stationary but the various components used in making the concrete panels move about the bed. The laser would simply be on a track above and along the entire length of the bed. The bed positioning device would also be above the bed and relative to the moving components, such as the concrete hopper, etc.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

The invention claimed is:

1. In a concrete casting machine for casting concrete panels including an elongated casting bed having a longitudinal length, the improvement comprising:

a) a bed positioning device which accurately indicates the longitudinal position of any point along the length of the bed; and b) a laser projection device positioned above said elongated casting bed, said laser projection device projecting a laser image onto said elongated casting bed from CAD computer files such that a CAD image for a particular spot on the bed is projected onto said bed after comparison to a signal from said bed positioning device; wherein said casting bed is movable on a track, and said laser projection device is mounted overhead on a track such that it may move and track with movement of the casting bed there under such that a projected laser image stays fixed on said elongated casting bed at a desired position even while the bed moves and then may move to project the next laser image on a different location.

2. In a concrete casting machine for casting concrete panels including an elongated casting bed having a longitudinal length, the improvement comprising:

a) a bed positioning device which accurately indicates the longitudinal position of any point along the length of the bed; and b) a laser projection device positioned above said elongated casting bed, said laser projection device projecting a laser image onto said elongated casting bed from CAD computer files such that a CAD image for a particular spot on the bed is projected onto said bed after comparison to a signal from said bed positioning device; wherein said bed positioning device includes a thermal expansion detector module to provide adjustments in length due to temperature expansion and contraction of said bed.

3. In a concrete casting machine for casting concrete panels including an elongated casting bed having a longitudinal length, the improvement comprising:

a) a bed positioning device which accurately indicates the longitudinal position of any point along the length of the bed; and b) a laser projection device positioned above said elongated casting bed, said laser projection device projecting a laser image onto said elongated casting bed from CAD computer files such that a CAD image for a particular spot on the bed is projected onto said bed after comparison to a signal from said bed positioning device; wherein said bed positioning device includes a toothed rack along the length of said casting bed and a pinion attached to a reader which transmits the position of said casting bed based on the position at said rack.

4. In a concrete casting machine for casting concrete panels including an elongated casting bed having a longitudinal length, the improvement comprising:

a) a bed positioning device which accurately indicates the longitudinal position of any point along the length of the bed; and b) a laser projection device positioned above said elongated casting bed, said laser projection device projecting a laser image onto said elongated casting bed from CAD computer files such that a CAD image for a particular spot on the bed is projected onto said bed after comparison to a signal from said bed positioning device; wherein said casting bed is movable on a track, and said laser projection device is mounted overhead on a track such that it may move and track with movement of the casting bed there under, wherein said bed positioning device includes a toothed rack along the length of said casting bed and a pinion attached to a reader which transmits the position of said casting bed based on the position at said rack.

5. A concrete casting machine comprising:

(a) an elongated concrete casting bed for casting concrete panels movable on rails said bed having a longitudinal length;

(b) a bed positioning device which accurately indicates the longitudinal position of any point along the length of the bed; and (c) a laser projection device positioned above said elongated casting bed, said laser projection device projecting a laser image onto said elongated casting bed from CAD computer files such that a CAD image for a particular spot on the bed is projected onto said bed after comparison to a signal from said bed positioning, wherein said laser projection device is mounted overhead on a track such that it may move and track with movement of the casting bed there under, said track moving in unison with said casting bed such that a laser image stays fixed on said casting bed at the same location even when the casting bed moves, said laser moving on its track to stay positioned over the moving bed such that the image may be fixed over a desired region until directed otherwise.

6. A concrete casting machine comprising:

(a) an elongated concrete casting bed for casting concrete panels movable on rails said bed having a longitudinal length;

(b) a bed positioning device which accurately indicates the longitudinal position of any point along the length of the bed; and (c) a laser projection device positioned above said elongated casting bed, said laser projection device projecting a laser image onto said elongated casting bed from CAD computer files such that a CAD image for a particular spot on the bed is projected onto said bed after comparison to a signal from said bed positioning device; wherein said bed positioning device includes a thermal expansion detector to provide adjustments in length due to expansion and contraction of said bed.

7. A concrete casting machine comprising:

(a) an elongated concrete casting bed for casting concrete panels movable on rails said bed having a longitudinal length;

(b) a bed positioning device which accurately indicates the longitudinal position of any point along the length of the bed; and (c) a laser projection device positioned above said elongated casting bed, said laser projection device projecting a laser image onto said elongated casting bed from CAD computer files such that a CAD image for a particular spot on the bed is projected onto said bed after comparison to a signal from said bed positioning, wherein said bed positioning device includes a toothed rack along the length of said casting bed and a pinion attached to a reader which transmits the position of said casting bed based on the position at said rack.

8. In a concrete casting machine for casting concrete panels including an elongated casting bed, the improvement comprising:

a) a bed positioning device including a toothed rack along the length of said casting bed and a pinion attached to a reader which transmits the position of said casting bed based on the position at said rack which accurately indicates the longitudinal position of any point along the length of the bed; and b) a laser projection device positioned above said elongated casting bed mounted overhead on a track such that it may move and track with movement of the casting bed there under, said laser projection device constructed and arranged to paint a laser image onto said elongated casting bed such that an image for a particular spot on the bed is projected onto said bed after comparison to a signal from said bed.

* * * * *